US012808898B2

(12) United States Patent
Liu et al.

(10) Patent No.: US 12,808,898 B2
(45) Date of Patent: Nov. 24, 2026

(54) APPARATUS FOR MEASURING WIND VELOCITY AND WIND DIRECTION AND RELATED SYSTEMS AND METHODS

(71) Applicant: EmMea Inc., Calgary (CA)

(72) Inventors: Willow Liu, Calgary (CA); Qi Jin, Calgary (CA)

(73) Assignee: EmMea Inc., Calgary (CA)

( * ) Notice: Subject to any disclaimer, the term of this patent is extended or adjusted under 35 U.S.C. 154(b) by 263 days.

(21) Appl. No.: 18/596,890

(22) Filed: Mar. 6, 2024

(65) Prior Publication Data

US 2024/0302403 A1 Sep. 12, 2024

Related U.S. Application Data

(60) Provisional application No. 63/450,370, filed on Mar. 6, 2023.

(51) Int. Cl.
*G01P 13/04* (2006.01)
*G01F 1/86* (2006.01)

(52) U.S. Cl.
CPC .............. *G01P 13/045* (2013.01); *G01F 1/86* (2013.01)

(58) Field of Classification Search
CPC .................................. G01P 13/04; G01F 1/86
See application file for complete search history.

(56) References Cited

U.S. PATENT DOCUMENTS

| | | | | |
|---|---|---|---|---|
| 4,920,808 | A | 5/1990 | Sommer | |
| 6,279,393 | B1 | 8/2001 | McLaughlin | |
| 7,093,483 | B2 | 8/2006 | Corey | |
| 7,870,784 | B2 * | 1/2011 | Santos | F03D 17/00 73/170.12 |
| 11,002,579 | B2 | 5/2021 | Ajay | |
| 11,193,459 | B2 * | 12/2021 | Demangeot | F02M 35/10091 |
| 2005/0034516 | A1 * | 2/2005 | Yoshida | F03D 17/00 73/170.01 |
| 2010/0140953 | A1 * | 6/2010 | Santos | F03D 80/80 73/170.12 |
| 2020/0355146 | A1 * | 11/2020 | Demangeot | G01F 1/00 |
| 2023/0122346 | A1 | 4/2023 | Cyrus | |

* cited by examiner

*Primary Examiner* — Jonathan M Dunlap

(57) ABSTRACT

An apparatus for measuring the wind velocity and wind direction that uses a three dimensional 360-degree rotating ambient flow intake assembly, a multiphase flowmeter and a blower, and establishes wind functions and further incorporates a neural network to reduce Gaussian noise. Such an apparatus can have high utility in systems that detect emissions.

19 Claims, 9 Drawing Sheets

APPARATUS FOR MEASURING WIND VELOCITY AND WIND DIRECTION AND RELATED SYSTEMS AND METHODS

CROSS-REFERENCES & RELATED APPLICATIONS

This application claims priority to U.S. Provisional Application No. 63/450,370 filed Mar. 6, 2023, and entitled "A new type of emissions detection and measurement system using multiphase flow analysis method" which is hereby incorporated by reference in its entirety under 35 U.S.C. § 119(e).

The present application claims priority to co-pending application Ser. No. 18/596,836 filed on the same day as the present application which is hereby incorporated by reference in its entirety.

TECHNICAL FIELD

The present disclosure relates generally to an apparatus that measures wind velocity and wind direction by incorporating a three-dimensional rotating ambient air flow intake assembly and a multiphase flowmeter, along with an associated method of analysis and calculations. The disclosure encompasses a technique for measuring both wind velocity and direction, employing the aforementioned integrated components, adaptable to various environmental conditions including rain and pollution.

BACKGROUND

There is an essential demand for real time continuous and accurate measurement and quantification of greenhouse gas (GHG) emissions. It is therefore vital for emission sensors or flowmeters to acquire accurate meteorological data such as wind velocity and wind direction. This information is required for environmental models to measure emissions at their source based on direct measurements taken at the sensor or flowmeter location. The paragraphs below explain in detail how emission monitoring efforts greatly benefit from real-time accurate and sensitive data on wind velocity and wind direction.

Additionally, GHG monitoring requires continuous and representative active sampling of atmospheric air. When integrated sequentially before existing emission sensors or flowmeters, this three-dimensional air in-take system facilitates the immediate measurement of GHG emissions in the nearby atmosphere. In its absence, these sensors or flowmeters would passively rely on emissions naturally drifting to their location through advection and diffusion, leading to quantification outcomes that are largely random and not fully representative of the nearby atmosphere.

Anemometers, a technology with ancient roots used to measure wind velocity and wind direction, have limitations in their traditional forms, especially in terms of accuracy and applicability. Various anemometer technologies include rotating cups, acoustic or doppler, hot-wired, and differential pressure sensors, among others, have different degrees of accuracy and adaptability to environmental extremes. In recent decades, differential pressure sensor-based anemometers rely solely on the Bernoulli Equation which does not account for variations in air density due to different weather conditions or pollution, leading to measurement inaccuracies. Additionally, the static placement of multiple pressure tabs used by such anemometers can result in/cause errors if one or more tabs are positioned downwind. Moreover, these exposed pressure tabs are susceptible to environmental damage, increasing the likelihood of device malfunction.

Additionally, measurement of wind direction as a byproduct of smoke detection has its limitations. Specifically, this technology lacks the capability of continuous and real-time measurement of wind direction or wind velocity when the smoke is not present.

Considering the limitations associated with traditional anemometers, there is a essential need and pressing demand for innovative methods and technologies capable of measuring wind velocity and wind direction. These new solutions should be highly adaptable and maintain precision across various environmental conditions, such as in the presence of rain and pollutants. This is particularly important in applications where wind data is critical for accurate and verifiable emission monitoring, measurement, and quantification.

BRIEF SUMMARY

An apparatus to measure wind velocity and wind direction, and its associated method and calculation is described below.

The apparatus features a three-dimensional rotating ambient air flow intake assembly, with the air inlet rotating 360 degrees around its axle mount, and the entire axle mount rotating 360 degrees around the center axis of the flowmeter chamber. This intake assembly ensures a air sample representative of the surrounding atmosphere is being delivered to the downstream flowmeter. The inlet's rotation along the two perpendicular axis defines a relative coordinate system while the rotational velocity provides the basic information for wind velocity and wind direction analysis.

The apparatus also features a multiphase flowmeter that conducts flow rate analysis of a multiphase mixture of dry air, airborne humidity and airborne pollutants, and measures dry wind velocity under varying environmental conditions.

The apparatus also features a blower, a mechanical device that is used to move air or other gases at moderate pressures.

The apparatus is therefore distinctly different from other existing and published devices, technologies, and methods for measuring wind velocity and wind direction. The following aspects, either individually or combined, constitute this distinct differentiation:

The present disclosure does not rely on the assumption that wind is single-phase dry airflow and devoid of humidity and airborne pollutants and/or that air density remains constant under a given air pressure and temperature.

The present disclosure provides improved measurement accuracy and sensitivity to wind velocity and wind direction, irrespective of changing wind directions. In other words, there is no limitation to the wind direction that may bypass one or multiple pressure ports, causing inaccurate measurement.

The present disclosure provides improved measurement accuracy and sensitivity to wind velocity and wind direction, irrespective of varying environmental conditions, including changing wind velocity. In other words, there is no limitation for a minimum wind velocity that may fall outside of the measurement range.

The present disclosure does not rely on the presence of smoke or other airborne substances to measure wind direction.

The present disclosure measures wind velocity and wind direction with real-time sensitivity and accuracy with measurement stability and repeatability.

First, the air inlet is rotating 360 degrees around its axle mount at an adjustable but known speed. The entire axle mount is further rotating 360 degrees around the center axis of the flowmeter chamber at another independently adjustable but known speed. The blower draws a representative sample of ambient air through the air inlet, under varying atmospheric conditions including wind velocity, wind direction, presence of humidity and presence of airborne pollutants. The multiphase flowmeter then conducts a thorough analysis, yielding a flow rate measurement of the dry air, excluding the effects of humidity and airborne pollutants. By combining this measurement with known blower velocity, air inlet rotation speeds along the two perpendicular axis which defines the relative location coordinate system, the wind velocity and wind direction is accurately determined.

The apparatus and method disclosed for analyzing and measuring wind velocity and wind direction offer precise, continuous, and real-time atmospheric data, maintaining accuracy even under environmental conditions of humidity and the presence of airborne pollutants.

It is an objective of the present disclosure to obviate or mitigate at least one disadvantage of previously disclosed devices, methods or technologies of measuring wind velocity and wind direction.

In a first aspect, the present disclosure provides an apparatus that measures wind velocity and wind direction by incorporating a three-dimensional/360-degree rotating ambient air intake system, a multiphase flowmeter, a blower and a main controller board configured to execute analysis and calculations.

The following parameters are defined for use in the equations that follow in this description:

$\vec{w}$=the wind vector
W=wind velocity
$\omega$=rotational velocity
t=time
Q=flow rate
$\mathcal{R}$=rotation matrix
$\theta$, $\phi$=spatial angles
$\Phi$=wind direction from due North, according to meteorological reporting standard In Example 1, an apparatus comprises a rotating flow intake assembly; a multiphase flowmeter; a blower; and a main controller board in operational communication with the multiphase flowmeter, wherein the main controller board is configured to execute wind functions and use a neural network to reduce Gaussian noise to output wind velocity and wind direction.

Example 2 relates to the apparatus of Examples 1 and 3-10, wherein the rotating flow intake assembly comprises of an air inlet that rotates independently along two perpendicular axis.

Example 3 relates to the apparatus of Examples 1-2 and 4-10, wherein the multiphase flowmeter is substituted with a single-phase flowmeter.

Example 4 relates to the apparatus of Examples 1-3 and 5-10, wherein the multiphase flowmeter is a volumetric multiphase flowmeter.

Example 5 relates to the apparatus of Examples 1-4 and 6-10, wherein the multiphase flowmeter is a mass multiphase flowmeter.

Example 6 relates to the apparatus of Examples 1-5 and 7-10, wherein the blower is a turbine.

Example 7 relates to the apparatus of Examples 1-6 and 8-10, wherein the blower is a fan.

Example 8 relates to the apparatus of Examples 1-7 and 9-10, wherein the main controller board is in operable communication with a data source containing known data.

Example 9 relates to the apparatus of Examples 1-8 and 10, wherein the known data comprises inlet rotation velocities along two perpendicular axis and blower flowrate.

Example 10 relates to the apparatus of Examples 1-9, wherein the apparatus is configured to measure wind velocity and wind direction in the presence of humidity and airborne particles/impurities.

In Example 11, a method for calculating wind parameters comprises sampling air using an airflow meter comprising: a rotating flow intake assembly; and a multiphase flowmeter; generating a wind function; using a neural network to solve the wind function for wind velocity; and obtaining one or more wind directional angles from the wind function.

Example 12 relates to the apparatus of Examples 11 and 13-15, further comprising accounting for a blower flowrate when generating the wind function.

Example 13 relates to the apparatus of Examples 11-2 and 14-15, further comprising accounting for a multiphase flowmeter flowrate when generating the wind function.

Example 14 relates to the apparatus of Examples 11-13 and 15, further comprising calculating a unit vector from a dynamic S-axis, one or more rotational velocities, and a wind vector, wherein the unit vector can be used to generate the wind function.

Example 15 relates to the apparatus of Examples 11-14, wherein the wind function and wind velocity are simplified to be two dimensional.

In Example 16, a system for calculating wind parameters comprises a rotating flow intake assembly; a multiphase flowmeter in fluidic communication with the rotating flow intake assembly; and a controller board in operable communication with the rotating flow intake assembly and the multiphase flow meter, wherein the rotating flow intake assembly sends measured data to the controller board and the controller board constructs and solves a wind function to output one or more values.

Example 17 relates to the apparatus of Examples 16 and 18-20, wherein the controller board uses a neural network to solve the wind function.

Example 18 relates to the apparatus of Examples 16-17 and 19-20, wherein the values comprise wind velocity and wind direction.

Example 19 relates to the apparatus of Examples 16-18 and 20, wherein the values further comprise sampled airflow rates, pressure, and temperature.

Example 20 relates to the apparatus of Examples 16-19, wherein the controller board first computes a unit vector before solving the wind function.

Other aspects and features of the present disclosure will become apparent to those ordinarily skilled in the art upon review of the following description of specific embodiments in conjunction with the accompanying figures.

DETAILED DESCRIPTION

Generally, the present disclosure provides an apparatus 1 and method of analysis for the measurement of wind velocity and wind direction.

Figure 1:
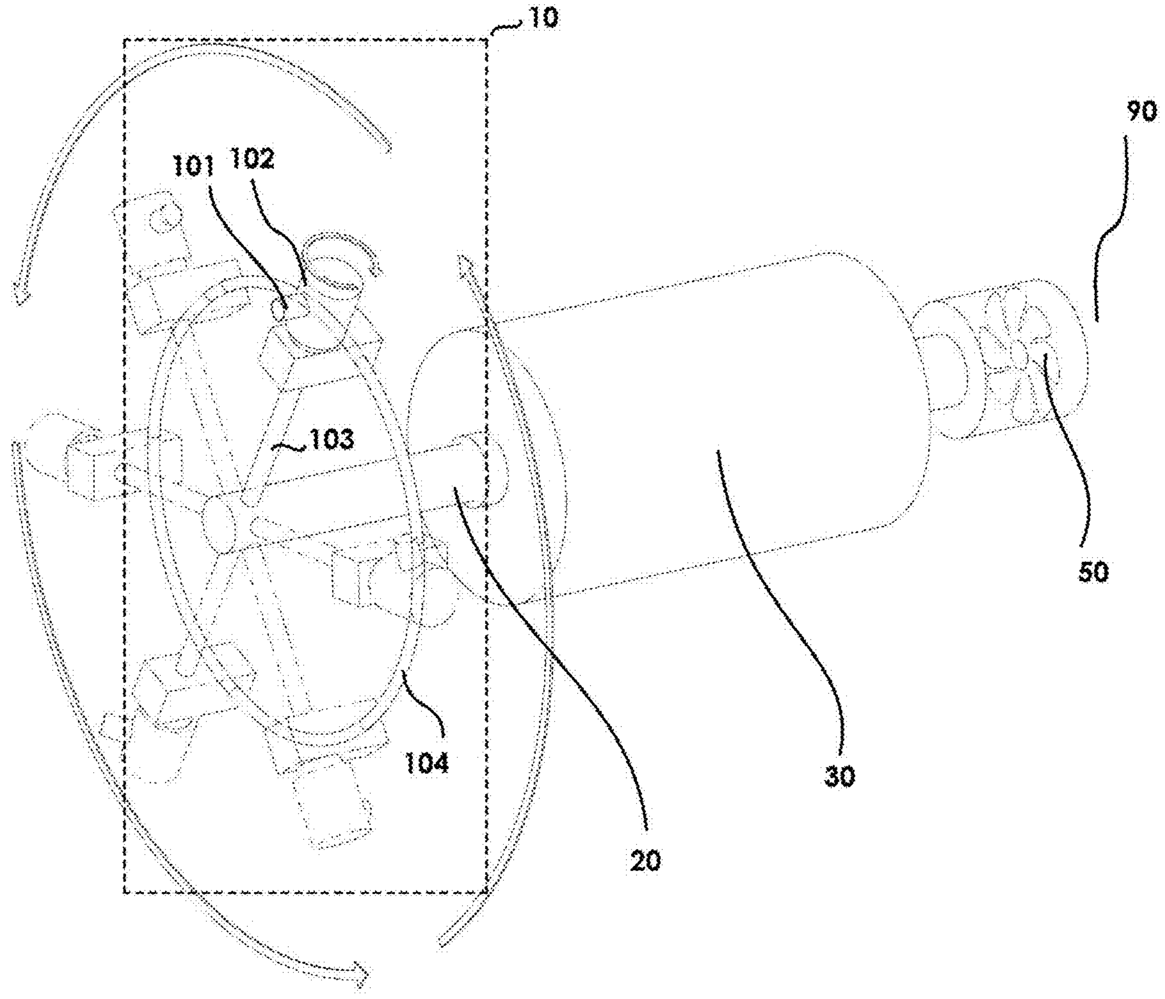
FIG. 1 is an isometric view of the apparatus with rotational positions shown, according to one implementation.

FIG. 1 features a main flow shaft that houses a flow channel 20, according to one implementation. At the front of the design is a three-dimensional/360-degree rotating ambient flow intake assembly 10, or just rotating flow intake assembly 10, installed at the entrance of the main flow shaft 20. This apparatus 1 integrates two independently rotating mechanisms: one for horizontal rotation and another for vertical rotation. The air inlet 101 is positioned on a horizontal rotation base 102 and is connected to the main flow shaft 20 through the axle mount 103. The horizontal rotation base 102 is designed to rotate 360 degrees around the axle mount 103 under electronic control. Furthermore, the entire horizontal assembly 105, including the air inlet 101 and horizontal rotation base 102, is also electronically maneuverable. The horizontal assembly 105 can independently execute a 360-degree rotation along a vertical rotation track 104, with the rotation centered around the main flow shaft 20. Following the ambient flow intake assembly 10 along the main flow shaft 20, a multiphase flowmeter 30 is installed in sequence. Further along the main flow shaft 20, there is a blower 50. As would be understood, the blower 50 can be any device that pushes air at moderate pressures due to work applied to the air. Examples of the blower 50 include, but are not limited to, axial fans, turbines, positive displacement blowers, and centrifugal blowers.

Figure 2:
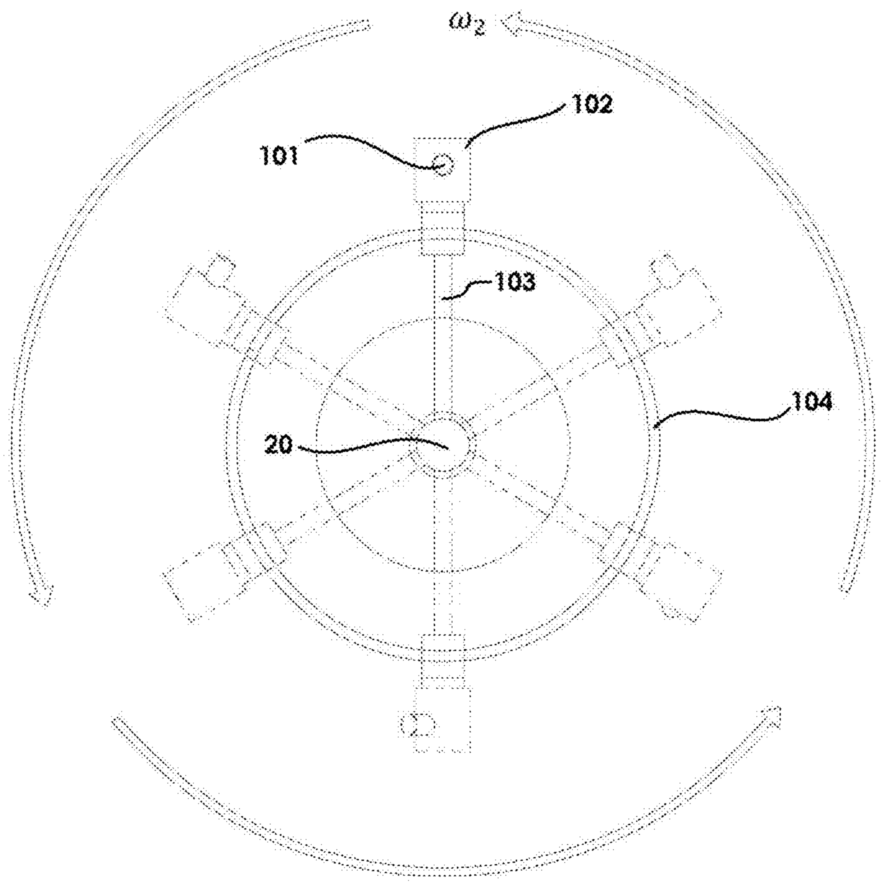
FIG. 2 is a front view of the apparatus, according to one implementation.

FIG. 2 is a front view of the three-dimensional rotating ambient air flow intake assembly 10 featured in FIG. 1. In this figure, the horizontal assembly 105 rotates in a circular motion along the vertical rotation track 104, with the axle mount 103 as the rotation arm centered at the main shaft 20. The rotation of the horizontal assembly 105 is done at some angular velocity $\omega_2$.

Figure 3:
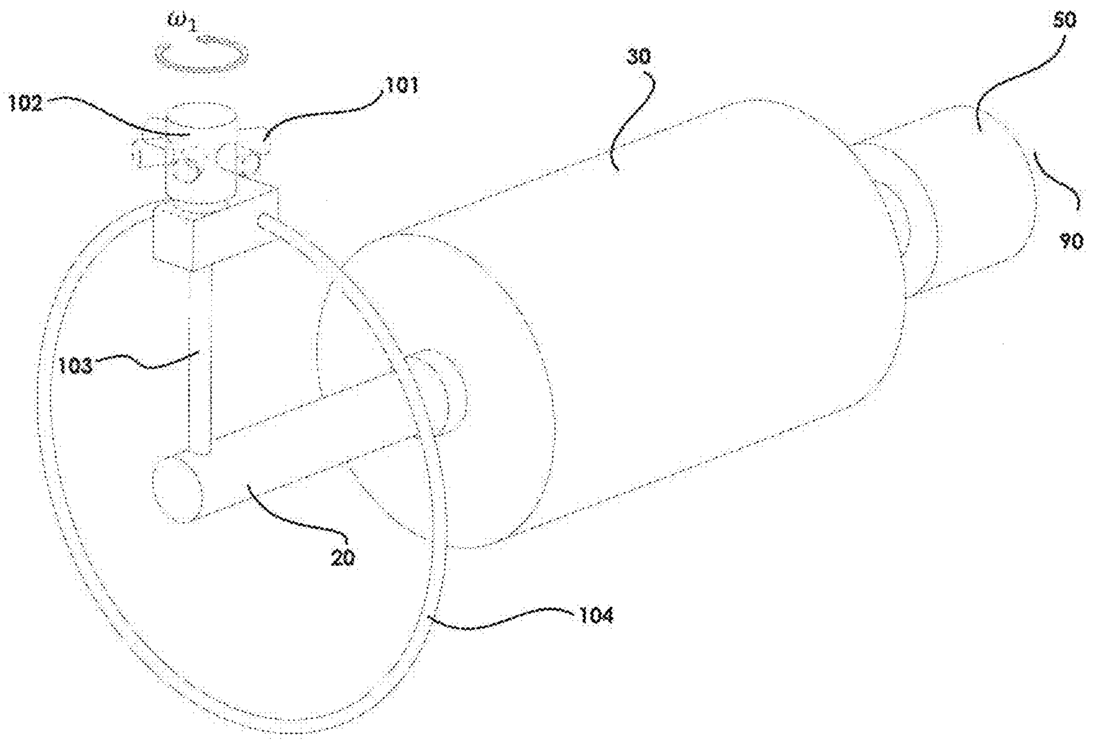
FIG. 3 is an isometric view of the apparatus, according to one implementation.

FIG. 3 presents another view of the apparatus 1 as FIG. 1 by emphasizing the horizontal rotational motion of the air inlet 101 and the horizontal rotation base 102, positioned atop the axle mount 103. The rotation of the air inlet 101 and the horizontal rotation base 102 is done at some angular velocity $\omega_1$.

Figure 4:
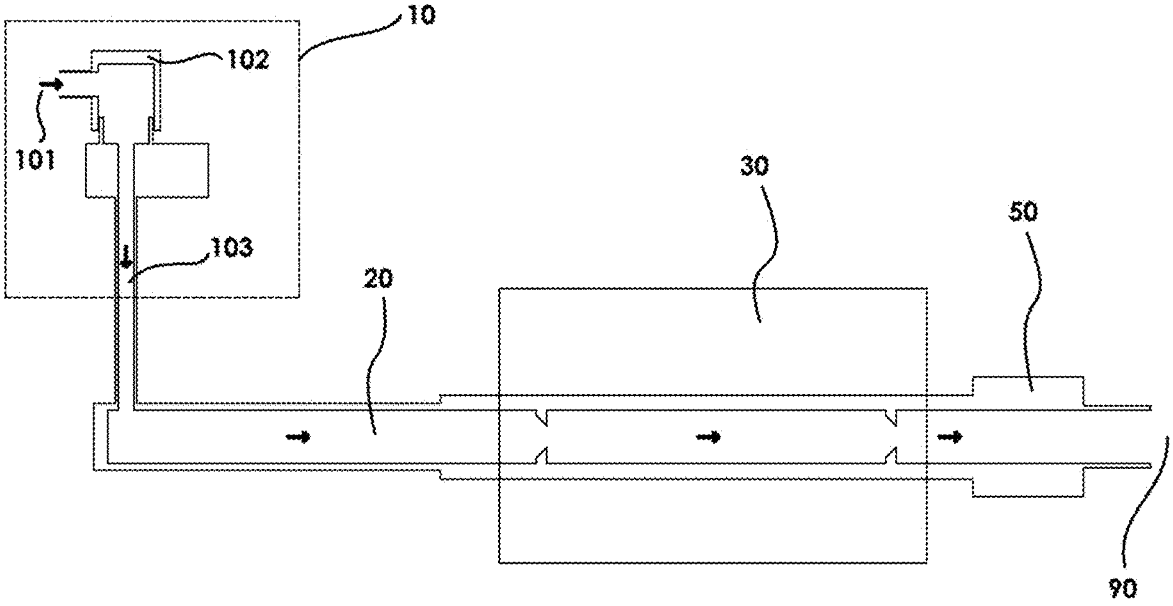
FIG. 4 is a cutaway view of the apparatus, according to one implementation.

FIG. 4 illustrates a cross-sectional view of the apparatus 1, showing horizontal assembly 105 in a vertical orientation configuration with the air inlet 101 directly facing away from the multiphase flowmeter 30 of the apparatus 1. Also shown is how sampled air 600 flows into the apparatus 1 through the air inlet 101, travels down the axle mount shaft 103, and enters the main flow shaft 20 leading to the multiphase flowmeter 30, according to one implementation. This process occurs as air is simultaneously pulled towards exit 90 by the blower 50 located at the end of the apparatus 1 assembly.

Figure 5A:
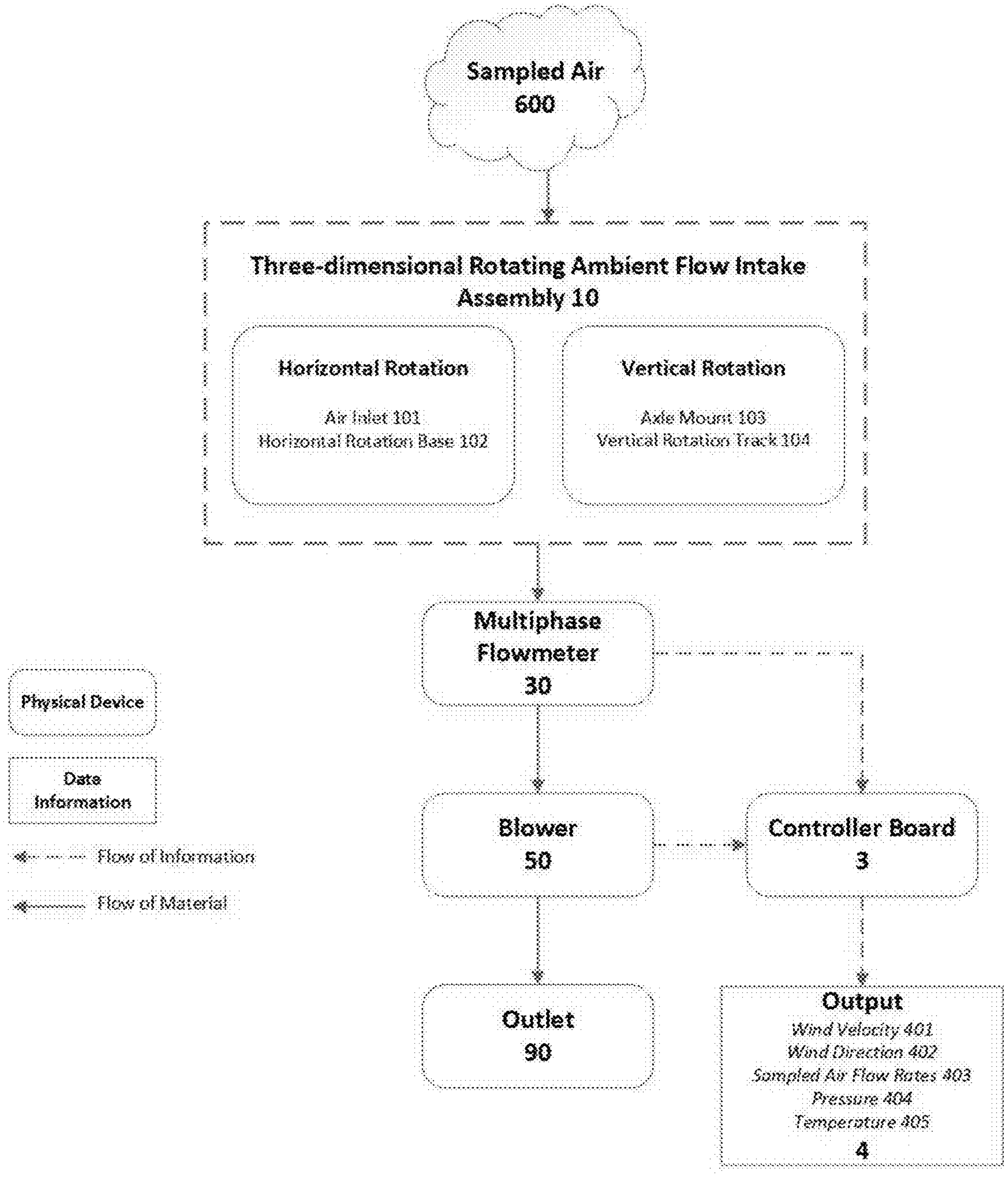
FIG. 5A is a diagram of the apparatus, according to one implementation.

FIG. 5A depicts a diagram of a sample apparatus 1, which includes a three-dimensional rotating ambient air flow intake assembly 10, a multiphase flowmeter 30, and a blower 50 among its physical components. Additionally, the apparatus 1 is equipped with a controller board 3 that performs analysis, calculations, and outputs data such as wind velocity 401, wind direction 402, sampled air flow rates 403, pressure 404, and temperature 405.

In various implementations, the main controller board 3 includes one or more computers that can be configured to perform particular operations or actions by virtue of having software, firmware, hardware, or a combination of them installed on the system that in operation causes or cause the system to perform the actions. Further, one or more computer programs can be configured to perform particular operations or actions by virtue of including instructions that, when executed by a data processing apparatus, cause the apparatus to perform the actions.

Figure 5B:
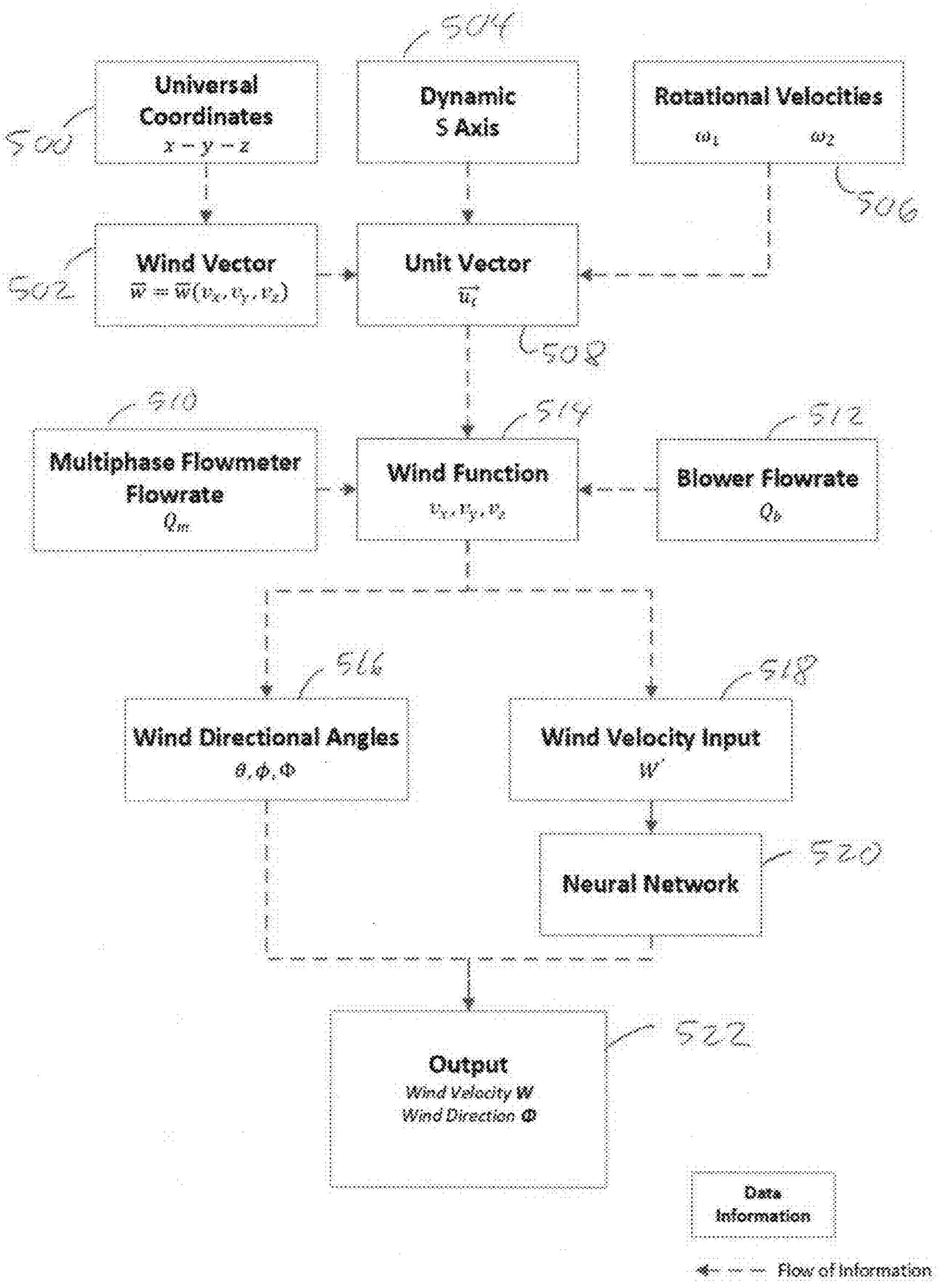
FIG. 5B is a flowchart of a method used by the apparatus, according to one implementation.

FIG. 5B is a flowchart detailing the data analysis and calculation process for the described apparatus 1 according to some implementations. It illustrates the progression of information, starting from the defined spatial coordinates and including the rotational velocities of the air inlet, measurements from the multiphase flowmeter, and flow rates from the blower. This leads to the formulation of a series of equations through the assistance of a NN, ultimately resulting in the determination of wind velocity and wind direction.

The apparatus 1, when calculating the wind velocity 401 and wind direction 402 according to some implementations, can begin by combining a wind vector $\vec{w}$ (box 502), which is written in one form of universal coordinates (x, y, z) (box 500), with data from a dynamic S-Axis (box 504), and one or more rotational velocities ($\omega_1$, $\omega_2$) (box 506) to calculate a unit vector $\vec{u}$ (box 508). The details of this calculation will follow. The unit vector $\vec{u}$ (box 508) can then be used alongside the multiphase flowmeter flowrate $Q_m$ (box 510) and the blower flowrate $Q_b$ (box 512) to calculate a wind function (box 514). Again, the details of this calculation will be given below. The wind function ($v_x$, $v_y$, $v_z$) (box 514) then uses the wind directional angles (θ, ϕ, Φ) (box 516) and wind velocity input (W') (box 518), alongside a neural network (box 520) to output wind velocity 401 and wind direction 402 (box 522).

Figure 6:
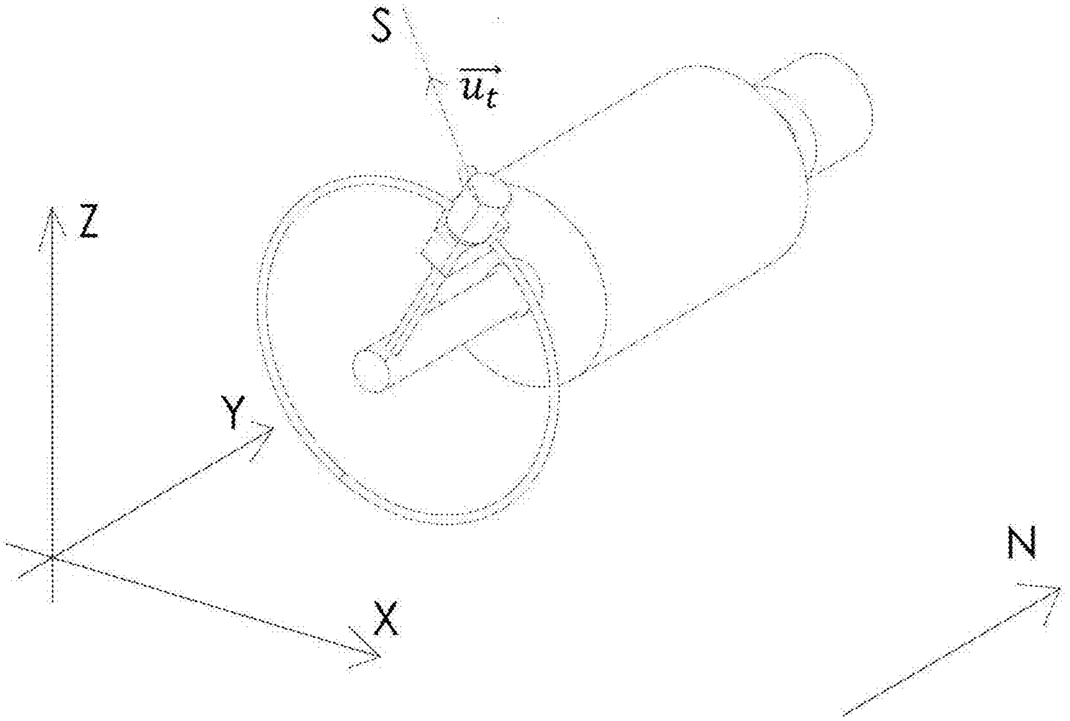
FIG. 6 is an isometric view of the apparatus showing the dynamic S-axis, according to one implementation.

FIG. 6 illustrates the spatial coordinates defined in this disclosure, alongside an example of the S-axis placement, centered on the air inlet 101.

Figure 7:
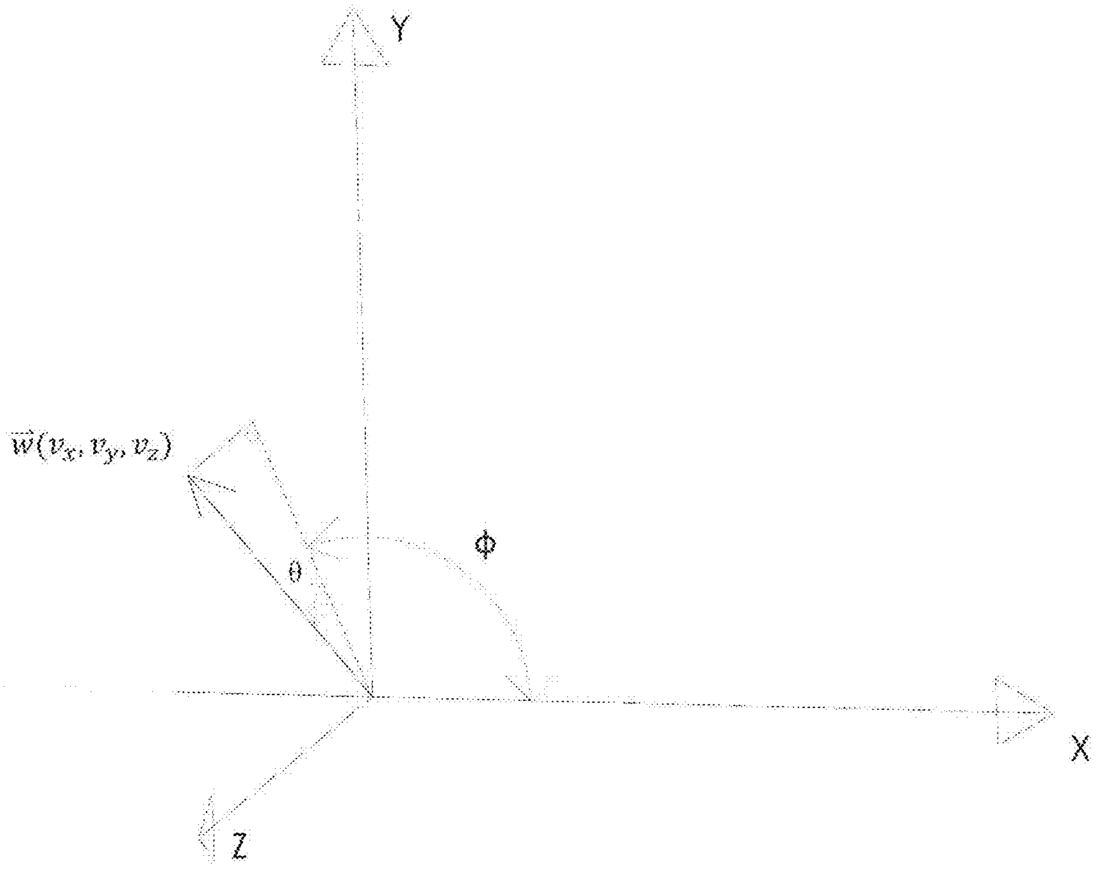
FIG. 7 shows a coordinate system used by the apparatus to obtain wind direction angles, according to one implementation.

FIG. 7 demonstrates how wind direction 402 and its respective spatial angles (θ, ϕ, Φ) are determined in relation to the spatial coordinates set out in FIG. 6.

From here, detailed explanation of methods and calculations used in various implementations will be discussed. These calculations are from the position of the air inlet 101 and measurements from the multiphase flowmeter 30 to the output of wind velocity 401 and wind direction 402.

In some implementations, the apparatus 1 includes a rotating flow intake assembly 10, that can rotate 360-degrees and obtain three-dimensional data; a multiphase mass flowmeter 30; and a blower 50. Such configurations may be achieved in a variety of ways, including for example, as shown in FIGS. 1 to 4.

As shown in FIG. 6, a three-dimensional fixed spatial coordinate system (x,y,z) has been set up, where the x-axis points eastward, the y-axis extends northward, and the z-axis directs upward towards the sky.

A spatial wind vector is noted as $\vec{w}=\vec{w}(v_x, v_y, v_z)$, where
$v_x$=wind velocity along the x-axis, or eastward wind
$v_y$=wind velocity along the y-axis, or northward wind
$v_z$=wind velocity along the z-axis, or updraft.

Additionally the S-axis can be centered on the air inlet 101, oriented perpendicularly to the inlet cross-section. The unit vector in the direction of S-axis is noted as $\vec{u}$. In various implementations, the rotational velocity ω of the air inlet 101 in two directions: $\omega_1$ is the horizontal rotational velocity of air inlet 101+base 102 around the axle mount 103. $\omega_2$ is the vertical rotational velocity of air inlet 101+base 102 along the vertical rotation track 104.

The initial unit vector which is along the S-axis but perpendicular to the cross-section of the air inlet 101 can be expressed as $$\vec{u_0}=(0,1,0)$$

where t represents the time elapsed and $t_0$ is the initial time of t=0.

Upon rotation around x-axis, the initial unit vector $\vec{u_0}$ becomes:

$$\overrightarrow{u_{\omega_1}} = \mathcal{R}_x \cdot \vec{u_0} = \begin{pmatrix} 1 & 0 & 0 \\ 0 & \cos\omega_1 t & -\sin\omega_1 t \\ 0 & \sin\omega_1 t & \cos\omega_1 t \end{pmatrix}\begin{pmatrix} 0 \\ 1 \\ 0 \end{pmatrix} = \begin{pmatrix} 0 \\ \cos\omega_1 t \\ \sin\omega_1 t \end{pmatrix} \quad (1)$$

where $\mathcal{R}_x$ is the x-axis rotation matrix.

Upon further rotation around y-axis, $\overrightarrow{u_{\omega_1}}$ becomes:

$$\vec{u_t} = \mathcal{R}_{-y} \cdot \overrightarrow{u_{\omega_1}} = \begin{pmatrix} \cos\omega_2 t & 0 & -\sin\omega_2 t \\ 0 & 1 & 0 \\ \sin\omega_2 t & 0 & \cos\omega_2 t \end{pmatrix}\begin{pmatrix} 0 \\ \cos\omega_1 t \\ \sin\omega_1 t \end{pmatrix} = \begin{pmatrix} -\sin\omega_1 t \sin\omega_2 t \\ \cos\omega_1 t \\ \sin\omega_1 t \cos\omega_2 t \end{pmatrix} \quad (2)$$

$$\vec{u_t} = (-\sin\omega_1 t \sin\omega_2 t, \cos\omega_1 t, \sin\omega_1 t \cos\omega_2 t).$$

The projection wind velocity $v_{projection}$ along the S-axis can thus be written as $$v_{projection} = \vec{u_t} \cdot \vec{w} = -v_x \sin\omega_1 t \sin\omega_2 t + v_y \cos\omega_1 t + v_z \sin\omega_1 t \cos\omega_2 t \quad (3)$$

The projection flow rate along the S-axis can be written as $$Q_{projection} = v_{projection} A \quad (4)$$

where A is the cross-sectional area of the air inlet 101.

If $Q_m$ is the flow rate measured by multiphase flowmeter 30, then $Q_{mx^*}$ is the flow rate when $$t = t_{x^*} = \frac{(2n-1.5)\pi}{\omega_2}$$

where (n=1, 2, 3, 4 . . . )

$Q_{my^*}$ is the flow rate when $$t = t_{y^*} = \frac{2n\pi}{\omega_1}$$

where (n=1, 2, 3, 4 . . . )

$Q_{mz^*}$ is the flow rate when $$t = t_{z^*} = \frac{2n\pi}{\omega_2}$$

where (n=1, 2, 3, 4 . . . )

x*,y*,z* serve to obtain specific timestamps $t_{x^*}$, $t_{y^*}$, $t_{z^*}$ as defined above that are independent of the spatial coordinates (x,y,z).

$Q_b$ is noted as the known flow rate of the blower 50.

There exists the following relationship among projection flow rate $Q_{projection}$, measured $Q_m$, known blower flow rate $Q_b$ and projection wind velocity $v_{projection}$.

$$Q_{projection} = Q_m - Q_b = v_{projection} A \quad (5)$$

Combining Equations 3 and 5 yields equations 6.

$$-v_x \sin\omega_1 t \sin\omega_2 t + v_y \cos\omega_1 t + v_z \sin\omega_1 t \cos\omega_2 t = \frac{Q_m - Q_b}{A} \quad (6)$$

Under specific scenarios, the following three Wind Functions can be derived from Equation 6:

When $$t = t_{y^*} = \frac{2n\pi}{\omega_1},$$

$\sin\omega_1 t=0$, $\cos\omega_1 t=1$ $$v_y = \frac{Q_{my^*} - Q_b}{A} \quad (7)$$

When $$t = t_{z^*} = \frac{2n\pi}{\omega_2},$$

$\sin\omega_2 t=0$, $\cos\omega_2 t=1$ $$v_y \cos\omega_1 t + v_z \sin\omega_1 t = \frac{Q_{mz^*} - Q_b}{A}$$

$$v_z = \left(\frac{Q_{mz^*} - Q_b}{A} - v_y \cos\omega_1 t\right)/\sin\omega_1 t = \left(\frac{Q_{mz^*} - Q_b}{A} - \frac{Q_{my^*} - Q_b}{A}\cos\frac{\omega_1}{\omega_2}2n\pi\right)/\sin\frac{\omega_1}{\omega_2}2n\pi \quad (8)$$

when $$t = t_{x^*} = \frac{(2n-1.5)\pi}{\omega_2},$$

$$\sin\omega_2 t = 1,$$

-continued $$\cos \omega_2 t = 0$$

$$-v_x \sin \omega_1 t + v_y \cos \omega_1 t = \frac{Q_{mx^*} - Q_b}{A}$$

$$v_x = -\left(\frac{Q_{mx^*} - Q_b}{A} - v_y \cos \omega_1 t\right)/\sin \omega_1 t = -\left(\frac{Q_{mx^*} - Q_b}{A} - \frac{Q_{my^*} - Q_b}{A}\cos\frac{\omega_1}{\omega_2}(2n - 1.5)\pi\right)/\sin\frac{\omega_1}{\omega_2}(2n - 1.5)\pi. \quad (9)$$

As would be understood, the two perpendicularly rotational velocities of the air intake $\omega_1$ and $\omega_2$ must not be integer multiples of each other at any point in time.

After time t, the wind velocity 401 input W' can be then calculated as follows:

$$W' = \sqrt{v_x^2 + v_y^2 + v_z^2} \quad (10)$$

where $v_x$ from the above Equation (9), $v_y$ from the above Equation (7) and $v_z$ from the above Equation (8).

Regarding the wind direction 402, the following angles are defined as in FIG. 7:

θ (rad) denotes the angle formed by the x-z plane and the wind vector $\vec{w}$ $$\theta = \arctan\left(\frac{v_z}{\sqrt{v_x^2 + v_y^2}}\right) \quad (11)$$

ϕ(rad) denotes the angle between the x-axis and the projection of the wind vector $\vec{w}$ on the x-z plane, given as:

$$\phi = \arctan\left(\frac{v_y}{v_x}\right). \quad (12)$$

The angle ϕ (rad) can be further translated into meteorological reporting standards using due north as the reference point, and in degrees (°):

$$\Phi = \phi * \frac{180}{\pi} - 90 \quad \text{if} \quad \phi * \frac{180}{\pi} - 90 \geq 0$$

$$\Phi = \phi * \frac{180}{\pi} + 270 \quad \text{if} \quad \phi * \frac{180}{\pi} - 90 < 0.$$

According to some implementations, the following steps entail employing a neural network ("NN" in equations), a deep learning architecture, to implement the aforementioned solutions in a practical setting. In this context, the spatial aspect of wind can be simplified to a two-dimensional representation on the y-x plane. Wind velocity 401 and wind direction 402 might fluctuate between $t_{y*}$ and $t_{x*}$, with phenomena like wind gusts potentially adding Gaussian noise to the measurements.

Figure 8:
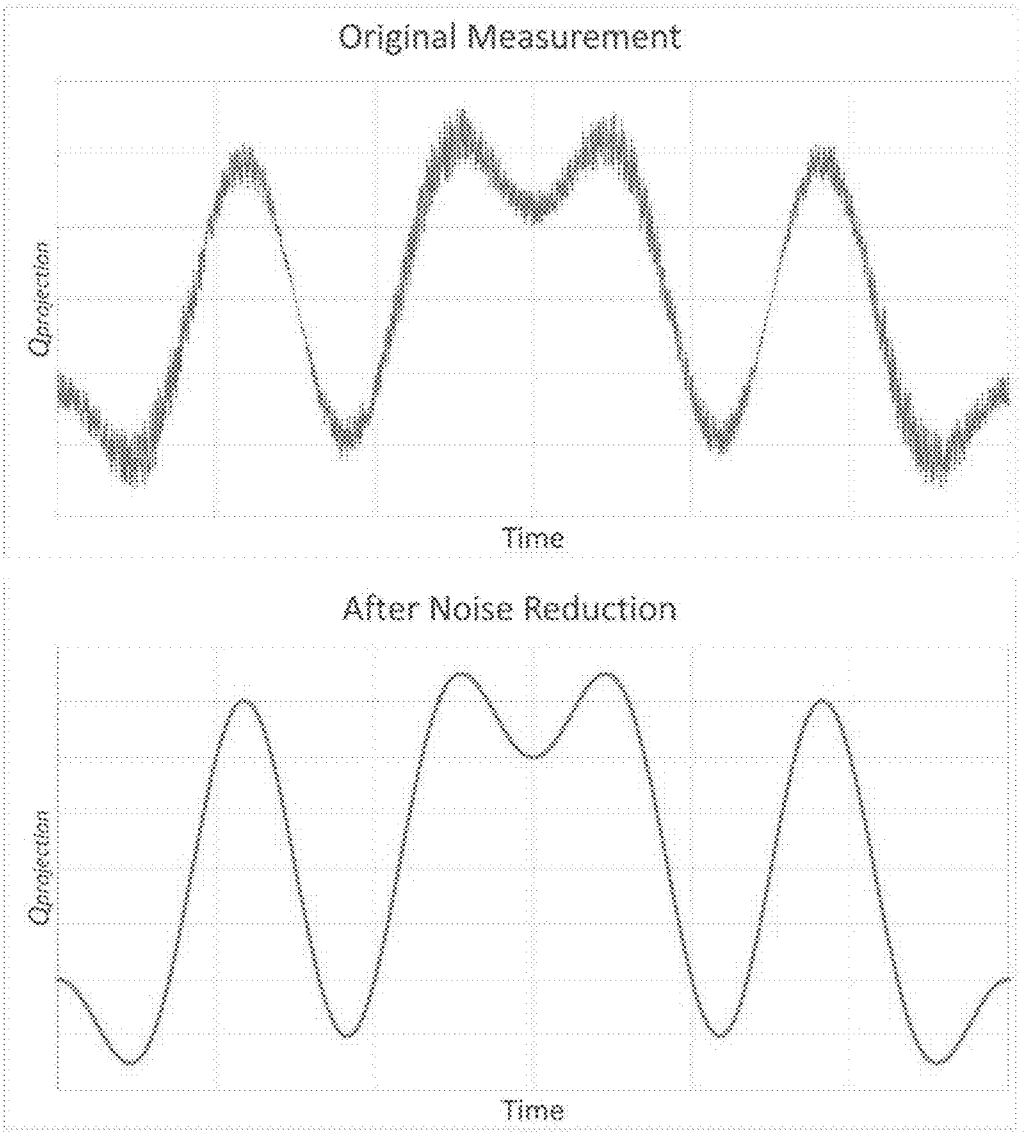
FIG. 8 shows two graphs of wind flow data, one with noise reduction and one without, according to one implementation.

A Fourier Loss Function can be applied to the data to reduce the effect of Gaussian noise. The lower graph of FIG. 8 shows the measurements after having been run through a Fourier Loss Function.

The neural network can use the preset wind vector $\vec{w} = \vec{w}(v_x, v_y, v_z)$ as the input.

Together with the two rotational velocities $\omega_1$, $\omega_2$ of the air inlet 101, the neural network utilizes the Fourier Loss Function, which is embedded in its hidden layer, to process and refine the measurement data, and filter out the Gaussian noise.

In its output layer, the neural network output $Q_{mNN}$ between the time $t_{y*}$ and $t_{x*}$.

$Q_{mNN}$ is the measured flow rate by the multiphase flow. $Q_{mNN}$ will be used to compare with $Q_m$ by applying the weight and bias which were obtained by the trained neural network.

The parameters thus computed by the disclosure include wind velocity 401, wind direction 402, sampled air flow rates 403, pressure 404, and temperature 405.

Although the disclosure has been described with reference to preferred implementations, persons skilled in the art will recognize that changes may be made in form and detail without departing from the spirit and scope of the disclosed apparatus, systems, and methods.

What is claimed is:

1. An apparatus, comprising:
- a rotating flow intake assembly;
- a multiphase flowmeter;
- a blower; and
- a main controller board in operational communication with the multiphase flowmeter,
- wherein the main controller board is configured to execute wind functions and use a neural network to reduce Gaussian noise to output wind velocity and wind direction.

2. The apparatus of claim 1, wherein the rotating flow intake assembly comprises of an air inlet that rotates independently along two perpendicular axis.

3. The apparatus of claim 1, wherein the multiphase flowmeter is a volumetric multiphase flowmeter.

4. The apparatus of claim 1, wherein the multiphase flowmeter is a mass multiphase flowmeter.

5. The apparatus of claim 1, wherein the blower is a turbine.

6. The apparatus of claim 1, wherein the blower is a fan.

7. The apparatus of claim 1, wherein the main controller board is in operable communication with a data source containing known data.

8. The apparatus of claim 7, wherein the known data comprises inlet rotation velocities along two perpendicular axis and blower flowrate.

9. The apparatus of claim 1, wherein the apparatus is configured to measure wind velocity and wind direction in the presence of humidity and airborne particles/impurities.

10. A method for calculating wind parameters comprising:
- sampling air using an airflow meter comprising:
  - a rotating flow intake assembly; and
  - a multiphase flowmeter;
- generating a wind function;
- using a neural network to solve the wind function for wind velocity; and
- obtaining one or more wind directional angles from the wind function.

11. The method of claim 10, further comprising accounting for a blower flowrate when generating the wind function.

12. The method of claim 11, further comprising accounting for a multiphase flowmeter flowrate when generating the wind function.

13. The method of claim 10, further comprising calculating a unit vector from a dynamic S-axis, one or more rotational velocities, and a wind vector, wherein the unit vector can be used to generate the wind function.

14. The method of claim 10, wherein the wind function and wind velocity are simplified to be two dimensional.

15. A system for calculating wind parameters comprising:

a) a rotating flow intake assembly;

b) a multiphase flowmeter in fluidic communication with the rotating flow intake assembly; and c) a controller board in operable communication with the rotating flow intake assembly and the multiphase flow meter, wherein the rotating flow intake assembly sends measured data to the controller board and the controller board constructs and solves a wind function to output one or more values.

16. The system of claim 15, wherein the controller board uses a neural network to solve the wind function.

17. The system of claim 15, wherein the values comprise wind velocity and wind direction.

18. The system of claim 15, wherein the values further comprise sampled airflow rates, pressure, and temperature.

19. The system of claim 15, wherein the controller board first computes a unit vector before solving the wind function.

* * * * *